(12) United States Patent
Zyskind et al.

(10) Patent No.: US 10,732,695 B2
(45) Date of Patent: Aug. 4, 2020

(54) TRANSITIONING A COMPUTING DEVICE FROM A LOW POWER STATE BASED ON SENSOR INPUT OF A PEN DEVICE

(71) Applicant: Microsoft Technology Licensing, LLC, Redmond, WA (US)

(72) Inventors: Amir Zyskind, Tel Aviv (IL); Zohar Nagola, Tel Aviv (IL); Eran Arbel, Netanya (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/125,750

(22) Filed: Sep. 9, 2018

(65) Prior Publication Data

US 2020/0081516 A1    Mar. 12, 2020

(51) Int. Cl.
| | |
|---|---|
| G06F 1/3231 | (2019.01) |
| G06F 1/3296 | (2019.01) |
| G06F 3/01 | (2006.01) |
| G06F 3/0346 | (2013.01) |
| G06F 3/0354 | (2013.01) |
| G06F 3/038 | (2013.01) |
| G06F 3/0488 | (2013.01) |

(52) U.S. Cl.
CPC .......... G06F 1/3231 (2013.01); G06F 1/3296 (2013.01); G06F 3/017 (2013.01); G06F 3/0346 (2013.01); G06F 3/0383 (2013.01); G06F 3/03545 (2013.01); G06F 3/04883 (2013.01)

(58) Field of Classification Search
None
See application file for complete search history.

(56) References Cited

U.S. PATENT DOCUMENTS

| | | |
|---|---|---|
| 7,907,901 B1 | 3/2011 | Kahn et al. |
| 8,766,954 B2 | 7/2014 | Vuppu et al. |
| 9,018,547 B2 | 4/2015 | Rimon et al. |
| 9,019,239 B2 | 4/2015 | Nishihara et al. |
| 9,081,448 B2 | 7/2015 | Geaghan |
| 9,239,637 B2 | 1/2016 | Westhues et al. |

(Continued)

FOREIGN PATENT DOCUMENTS

| | | |
|---|---|---|
| CN | 106095143 A | 11/2016 |
| CN | 107168689 A | 9/2017 |
| WO | 2016025185 A1 | 2/2016 |

OTHER PUBLICATIONS

"Non Final Office Action Issued in U.S. Appl. No. 16/125,752", dated Oct. 3, 2019, 24 Pages.

(Continued)

*Primary Examiner* — Christopher J Kohlman

(57) ABSTRACT

The disclosure herein describes causing a computing device to transition from a low power state using a pen device. The pen device obtains gesture input data from at least one sensor of the pen device and the obtained gesture input data is compared to at least one gesture pattern. Based on the gesture input data matching the at least one gesture pattern, the pen device generates a wakeup event message. The pen device transmits the wakeup event message to the computing device using a communication protocol that the computing device is configured to receive in the low power state. The described power state transition method provides a flexible, customizable way for users to wake up computing devices using the pen device.

20 Claims, 7 Drawing Sheets

(56) References Cited

U.S. PATENT DOCUMENTS

| | | |
|---|---|---|
| 9,329,703 B2 | 5/2016 | Falkenburg et al. |
| 9,395,800 B2 | 7/2016 | Liu et al. |
| 9,703,946 B2 | 7/2017 | Chandran et al. |
| 9,891,773 B2 | 2/2018 | Polishchuk |
| 9,921,626 B2 | 3/2018 | Bentov |
| 2011/0294417 A1 | 12/2011 | Mine et al. |
| 2012/0191993 A1 | 7/2012 | Drader et al. |
| 2012/0331546 A1 | 12/2012 | Falkenburg et al. |
| 2013/0082937 A1 | 4/2013 | Liu et al. |
| 2013/0257777 A1* | 10/2013 | Benko et al. ............ 345/173 |
| 2014/0218343 A1 | 8/2014 | Hicks et al. |
| 2014/0253522 A1 | 9/2014 | Cueto |
| 2014/0281626 A1* | 9/2014 | Younger ............ G06F 1/3203 713/323 |
| 2014/0368423 A1 | 12/2014 | Brenckle et al. |
| 2015/0149801 A1* | 5/2015 | Vandermeijden ... G06F 3/04883 713/323 |
| 2015/0205388 A1 | 7/2015 | Osterhout |
| 2016/0026252 A1 | 1/2016 | Mccoy et al. |
| 2016/0195941 A1 | 7/2016 | Gur et al. |
| 2017/0102758 A1 | 4/2017 | Siaw et al. |
| 2017/0255328 A1 | 9/2017 | Zyskind |
| 2018/0024651 A1 | 1/2018 | Haran et al. |
| 2018/0113523 A1 | 4/2018 | Hara et al. |
| 2019/0005954 A1* | 1/2019 | Xie ..................... G10L 15/22 |
| 2020/0081560 A1 | 3/2020 | Geller et al. |

OTHER PUBLICATIONS

"International Search Report and Written Opinion Issued in PCT Application No. PCT/US2019/038838", dated Sep. 3, 2019, 12 Pages.

"International Search Report and Written Opinion Issued in PCT Application No. PCT/US2019/038835"dated Oct. 14, 2019, 11 Pages.

"Final Office Action Issued in U.S. Appl. No. 16/125,752", dated Apr. 1, 2020, 21 Pages.

"Applicant Initiated Interview Summary Issued in U.S. Appl. No. 16/125,752", dated Apr. 29, 2020, 5 Pages.

* cited by examiner

TRANSITIONING A COMPUTING DEVICE FROM A LOW POWER STATE BASED ON SENSOR INPUT OF A PEN DEVICE

BACKGROUND

Many modern computing devices include associated pen devices, or styluses, that are configured for use with the computing devices. For instance, pen devices may be used to write and/or draw on a touchscreen interface of the computing device, simulating writing or drawing on paper with a pen, pencil, or other writing instrument. Pen devices also may be equipped with a variety of sensors (e.g., pressure sensors, inertial measurement units (IMUs), buttons, switches, microphones, etc.) that can be used to gather data to enable interaction with the computing device (e.g., sensors or other components for interacting with a digitizer component of the computing device, such as proximity sensing).

However, many of the interactions with the pen device, such as pen detection by the digitizer of the computing device, require large amounts of power in comparison to the power budget of a computing device in a low power state. For example, detecting movement and proximity of the pen device by the digitizer of the computing device at a low latency consumes a substantial amount of the power budget of the computing device in the low power state. Thus, the operations enabled by pen devices are not well-suited for use while a computing device is in the low power state. For instance, triggering the computing device to transition from the low power state to an active state based on low latency detection of pen device activity by the computing device results in consistent, relatively high-power consumption by the computing device, thereby reducing the power efficiency of the low power state of the computing device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method and system for causing a computing device to transition from a low power state using a pen device is described. The pen device obtains gesture input data from at least one sensor of the pen device and the obtained gesture input data is compared to at least one gesture pattern. Based on the gesture input data matching the at least one gesture pattern, the pen device generates a wakeup event message. Then, the pen device transmits the wakeup event message to the computing device over a network interface of the pen device, wherein the wakeup event message is transmitted using a communication protocol that the computing device is configured to receive in the low power state.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale.

DETAILED DESCRIPTION

Figure 1:
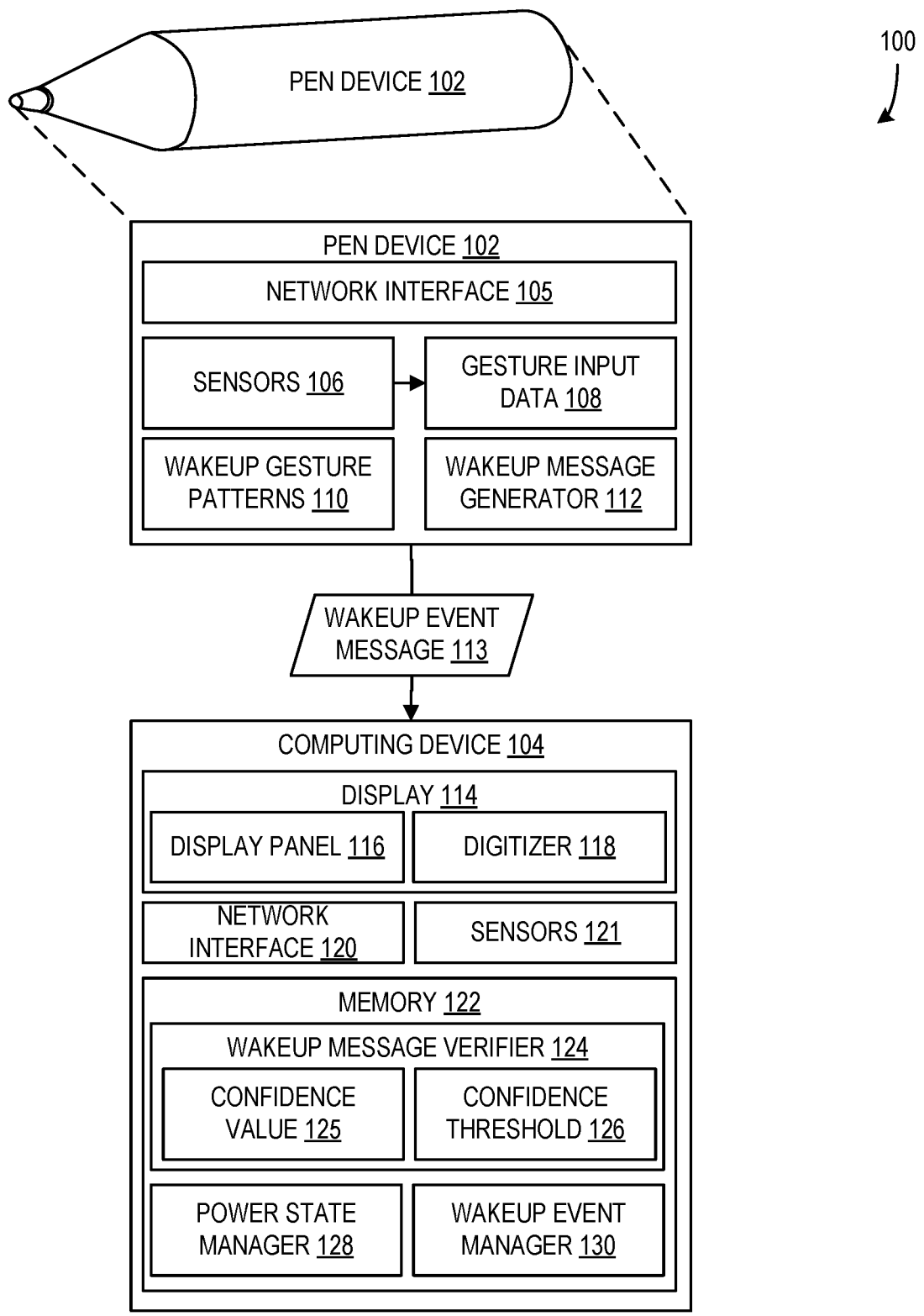
FIG. 1 is an exemplary block diagram illustrating a system configured transitioning a computing device out of a low power state based on gesture input from a pen device according to an embodiment.

Aspects of the disclosure provide a system and method for transitioning a computing device from a low power state based on sensor data from a pen device. The pen device obtains gesture input data from associated sensors. The gesture input data is compared to gesture patterns that are stored on the pen device and, when the gesture input data matches a gesture pattern, a wakeup event message is generated. The pen device transmits the wakeup event message to the computing device using a network connection/protocol that the computing device is configured to use while in the low power state. When the computing device receives the wakeup event message, it may verify that the message is accurate based on a calculated confidence value. Upon verification of the message, the computing device transitions from the low power state to an active state or other similar state.

Additionally, or alternatively, the computing device and pen device may be configured to cause the computing device to change a mode of operation of the computing device based on an interaction with the pen device. The pen device may be configured to wake up based on detecting a wakeup gesture pattern from a user and, upon waking up, the pen device may detect an uplink signal from the computing device via an electrostatic communication channel. In response to the uplink signal, the pen device may send a signal to change a mode of operation of the computing device to the computing device by a network interface or a communication channel other than the electrostatic communication channel. The computing device may receive the signal to change a mode of operation and, in response, perform operations to change the mode of operation based on the received signal. For example, the computing device and the pen device may begin an initial pairing process.

The described methods and systems provide users with an efficient, flexible way to "wake up" a computing device, transition the computing device to an active state, and/or otherwise change the operations of computing devices that include pen devices using intuitive, user-friendly movements and other interactions with the pen devices and/or electrostatic communication between the computing devices and pen devices. Further, users are enabled to create and customize wakeup gesture patterns for use with their computing devices and such wakeup gesture patterns may also be used to trigger quick access to appropriate applications when a computing device transitions from a low power state (e.g., an ink-based, note-taking application opening immediately upon the computing device transitioning to an active state in response to a gesture from the pen that includes a gesture simulating writing on a surface, etc.). The described systems operate in an unconventional way to make use of the sensors of pen devices and the link between the pen devices and computing devices to provide intuitive methods for waking up computing devices in low power states and/or otherwise changing the modes of operation of computing devices. In this manner, the disclosure reduces memory and power consumption of the computing device, thereby improving the functioning of the computing device and solving a technical problem. Further, the disclosure reduces power consumption of the pen device at least because the pen device does not have to transmit and/or exit its low power state until the pen device is confident in the wakeup process, thereby improving the functioning of the pen device and solving a technical problem.

FIG. 1 is an exemplary block diagram illustrating a system 100 configured transitioning a computing device 104 out of a low power state based on gesture input 108 from a pen device 102 according to an embodiment. The system 100 includes a computing device 104 and a pen device 102 (illustrated as a pen and as nested blocks representing components of the pen device 102). In some examples, the pen device 102 is linked to the computing device 104 and configured to only or primarily function with the computing device 104 (e.g., a pen device or stylus included with a tablet device, phablet device, or laptop device, etc.). Further, the computing device 104 and pen device 102 are configured to perform the operations described herein, as well as other conventional computer operations (e.g., receiving user input, displaying output, executing applications, etc.).

In some examples, the pen device 102, or stylus, is a pen-shaped device that includes a network interface 105 configured to enable the pen device 102 to communicate with the computing device 104 and/or other computing devices (e.g., WI-FI communications, BLUETOOTH communications, near field communications (NFC), etc.) and other computer components, such as a processor, memory, and input/output (I/O) components. For instance, the pen device 102 includes sensors 106 that are configured for collecting sensor data that is indicative of interactions of the pen device 102 with users, other devices, or other objects. Sensors 106 may include an inertial measurement unit (IMU) configured to detecting motion and/or impact of the pen device 102, one or more pressure sensors configured for detecting contact with the pen device 102 (e.g., a pressure sensor in the tip of the pen device 102 for detecting when it is in contact with a surface for collecting writing data, a pressure sensor in the shaft of the pen device 102 for detecting when and/or how the pen device 102 is being gripped by a user, etc.), button sensors, switch sensors, microphones configured for collecting audio data near the pen device 102, etc.

In some examples, the data collected from the sensors 106 by the pen device 102 is obtained as gesture input data 108, which is input data used to identify when a user makes a wakeup gesture using the pen device 102. Gesture input data 108 may include sensor data from any and/or all of the sensors 106. The data that is obtained as gesture input data 108 may be based on the types of data that make up the wakeup gesture patterns 110, which are stored and/or registered data patterns that are configured to indicate sensor data that is obtained when a wakeup gesture is performed with the pen device 102. For instance, a wakeup gesture pattern 110 may include two detected impacts from a pressure sensor on the tip of the pen device 102 with a defined time interval between the two impacts. Such a wakeup gesture pattern 110 may include a series of pressure sensor data points over a time period, with relatively higher data point values at the beginning and end of the series representing the two impacts. Alternatively, the pressure sensor may be configured to provide binary output, such that the sensor is either activated or not activated. In that case the wakeup gesture pattern 110 may require the detection of two pressure sensor activations in series, and optionally, the wakeup gesture pattern 110 may include a defined time interval between the two activations.

In some examples, the pen device 102 and/or the computing device 104 in conjunction with the pen device 102 may be configured to detect other gesture types based on the sensors of the pen device 102 and/or computing device 104. For instance, gestures may be associated with "writing" with the pen device 102 (e.g., causing the computing device 104 to receive writing or drawing data from the motion and/or contact of the pen device 102, etc.), "erasing" with the pen device 102 (e.g., causing writing or drawing data to be erased in response to an associated "erase" gesture, etc.), activation of applications, navigation through interfaces, etc. Such gestures may also be represented by gesture patterns as described herein and/or the gestures may be detected according to any gesture detection process as would be understood by a person of ordinary skill in the art. Further, some or all other gestures that the described system is configured to detect may be treated as wakeup gestures, such that, when one or more of these other gestures is detected, whether by matching to a gesture pattern or another gesture detection method, a wakeup event may be triggered in the same way as when gesture input data 108 matches a wakeup gesture pattern 110 as described herein.

The pen device 102 is configured to compare obtained gesture input data 108 to the wakeup gesture patterns 110 to determine when a user intends to perform a wakeup event on the computing device 104 (e.g., transition the computing device 104 out of a low power state or mode (a sleep state, a suspend state, a stand-by state, etc.), etc.). If the gesture input data 108 matches the wakeup gesture patterns 110, the pen device 102 is configured to use the wakeup message generator 112 to generate a wakeup even message 113. In some examples, the wakeup gesture patterns 110 may include defined acceptable margins of error for the purposes of matching to obtained gesture input data 108. For instance, if a pattern 110 requires that sensor data points be received with a 1 second time period separating them, the pattern 110 may include a margin of error of 20%, such that data points that are received with 0.8 seconds separating them or with 1.2 seconds separating them, the data points are considered to match the pattern 110. Such margins of error may be defined for patterns 110 by default (e.g., a default margin of error or 10% may be defined for each requirement of a pattern 110, etc.) and/or they may be defined by a user when creating or editing a pattern 110. Alternatively, or additionally, margins of error of the patterns 110 may be adjusted based on received feedback and/or machine learning as described herein. It should be understood that margins of error may be applied to time-based pattern requirements, data value-based pattern requirements, or other types of pattern requirements without departing from the description herein.

Figure 2A:
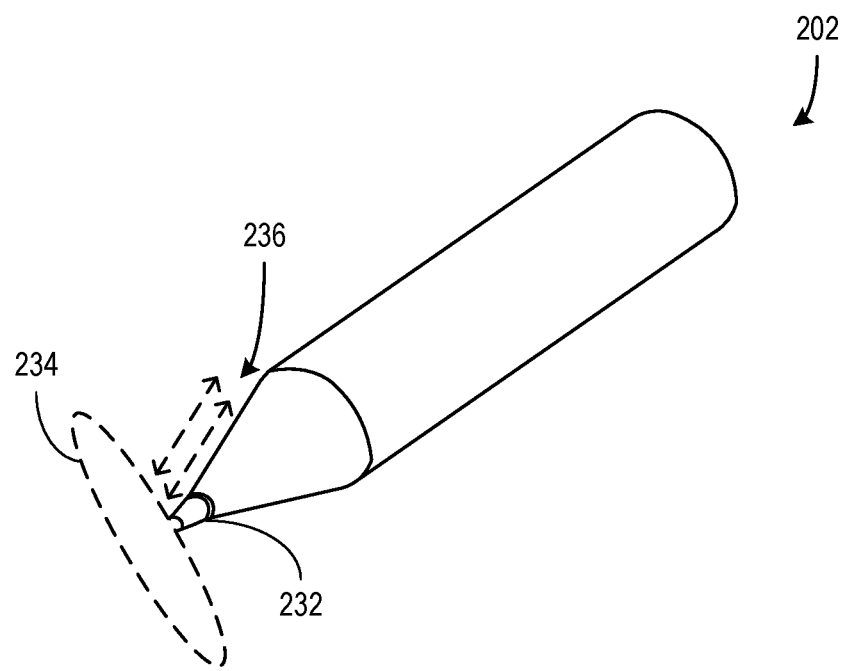
FIGS. 2A and 2B are exemplary block diagrams illustrating methods of a pen device obtaining gesture input data according to respective embodiments.
Figure 2B:
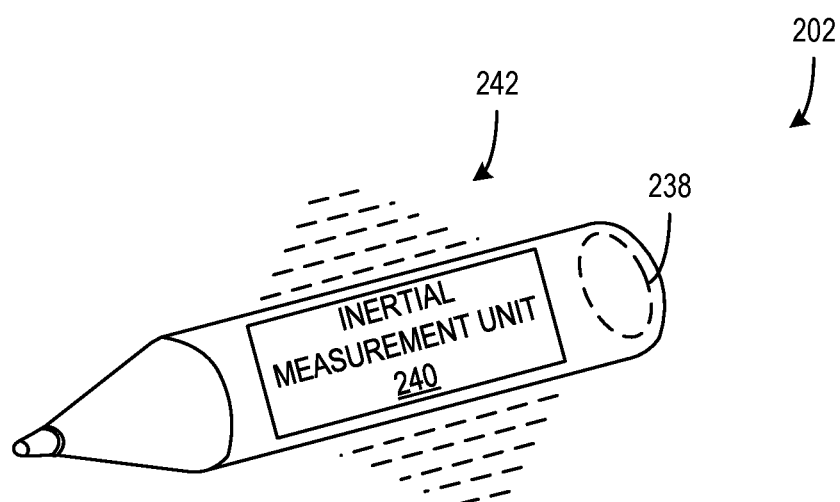

FIGS. 2A and 2B are exemplary block diagrams illustrating methods of a pen device obtaining gesture input data according to respective embodiments. In FIG. 2A, a pen device 202 is configured to include a pressure sensor 232 in the tip of the pen device 202. Gesture input data 108 may be collected based on the pressure sensor 232 being tapped, pressed, or otherwise placed in contact with a surface 234 (e.g., a surface of the computing device, a table, etc.). In some examples, gesture input data 108 including to taps on the pressure sensor 232 in sequence, as illustrated at 236. The wakeup gesture patterns 110 may include a pattern including pressure input from the pressure sensor 232 that occurs twice in sequence with a defined time period between the inputs (e.g., between 0.5 seconds and 1.5 seconds, etc.). If the two taps of the pen device 202 at 236 match the pattern (e.g., the taps are sufficient to provide pressure input from the sensor 232 and the taps are timed to match the defined time period between the pressure input of the pattern, etc.), the pen device 202 will generate a wakeup event message 113 as described below.

Alternatively, or additionally, in FIG. 2B, the pen device 202 is configured to include a button 238 and an inertial measurement unit (IMU) 240. Gesture input data 108 may include activation data points from the button 238 and/or motion data from the IMU 240. A wakeup gesture pattern 110 may include a combination of activation data from the button 238 and motion data from the IMU 240. For instance, the pattern may require that a user press and/or hold the button 238 and then move the pen device 202 in one or more motions after pressing (e.g., within a defined time period after the button 238 is pressed, such as within 1 second, within 2 seconds, etc.) and/or during holding the button 238, as illustrated at 242. As a result, inadvertent movement of the pen device 202 is less likely to accidentally cause a wakeup event message to be generated, as the button 238 must also be pressed or held. The motion data from the IMU 240 required by the pattern may include one or more movements in specific directions, simply moving or shaking the pen device 202 back and forth, or other motion patterns that can be detected by the IMU 240. It should be understood that the required sensor data for matching to the wakeup gesture patterns 110 may include more, fewer, and/or different sensor data points without departing from the description here.

Returning to FIG. 1, the wakeup message generator 112 is a software component of the pen device 102 configured to take the gesture input data 108 as input and generate a wakeup event message 113 as output, as described herein. The generation of the wakeup event message 113 may include transforming some or all of the gesture input data 108 into a format that is compatible with a defined network communication protocol associated with the computing device 104 and the pen device 102. Alternatively, or additionally, the wakeup event message 113 may include a wakeup event code that is defined to indicate to the computing device 104 that a wakeup gesture has been performed and/or identify the wakeup gesture pattern 110 associated with the wakeup event message 113.

The computing device 104 includes a display 114, which further includes a display panel 116 sub-component configured for displaying output of the computing device 104 to a user and a digitizer 118 sub-component configured for detecting contact and/or proximity of the pen device 102 or other objects to the display 114 surface, etc., a network interface 120, sensors 121, and memory 122. The computing device 104 is further configured to operate in a plurality of power states, including at least a low power state (e.g., a sleep state, a suspend state, etc.), during which some sub-components and/or processes of the computing device 104 are disabled or otherwise configured to consume less power, and an active state (e.g., an awake state, a default state, etc.), during which the sub-components and/or processes operate according to default behavior and potentially consumer higher levels of power than when in the low power state. For instance, when the computing device is in the low power state, the display 114 may be disabled, including the digitizer 118, and the network interface 120 may be configured to only operate using a subset of potential communication protocols that require less power (e.g., WI-FI may be disabled while BLUETOOTH remains enabled, etc.). Other components, such as other user interfaces, may also be disabled. Further, sub-components and/or process that remain active in the low power state may be configured to operate at a higher latency (e.g., to operate less often, such as once per second instead of once per 50 milliseconds, etc.) to reduce power consumed. Methods of transitioning the computing device 104 out of the low power state, or waking the computing device 104, make use of the processes of the computing device 104 that are still active in the low power state (e.g., if the digitizer 118 is fully deactivated in the low power state, tapping on the display 114 surface cannot be detected and therefore cannot wake the computing device 104 from the low power state, etc.).

The network interface 120 of the computing device 104 may include hardware, firmware, and/or software configured to enable the computing device 104 to communicate with other devices, including the pen device 102. The network interface 120 may be configured to communicate via one or more wireless and/or radio communication protocols (e.g., WI-FI, BLUETOOTH, near field communication (NFC), cellular communication protocols, etc.), one or more wired communication protocols (e.g., Ethernet, etc.), or the like. As noted above, some or all of the capabilities of the network interface 120 may be disabled or reduced when the computing device is in the low power state.

The memory 122 is configured to include instructions and/or data associated with software applications that are executed on the computing device, as would be understood by a person of ordinary skill in the art. In some examples, the applications and data in the memory 122 include a wakeup message verifier 124, a power state manager 128, and a wakeup event manager 130. When the computing device 104 is in a low power state and it receives a wakeup event message 113, the components 124-130 may be used by the computing device 104 to transition out of the low power state to an active power state or other power state.

The wakeup message verifier 124 is a software application configured to receive the wakeup event message 113 as input and verify that it is the result of an attempt by a user to wake the computing device 104. The wakeup message verifier 124 may further be configured to use sensor data from sensors 121 (e.g., an internal IMU, touch sensors, microphones or other audio sensors, etc.) of the computing device 104 as input in addition to the wakeup event message 113. In some examples, the wakeup gesture patterns 110 may be relatively simple, such that users may inadvertently trigger a wakeup event message 113 while carrying the pen device 102, playing with the pen device 102, bumping into the pen device 102, etc. The wakeup message verifier 124 is configured to calculate a confidence value 125 and compare the confidence value 125 to a confidence threshold 126. If the confidence value 125 exceeds or otherwise surpasses the confidence threshold 126, the received wakeup event message 113 is treated as indicating a legitimate wakeup event and the power state manager 128 is used to transition the computing device 104 from the low power state to an active power state or other power state. The calculation of confidence values 125 and comparison to the confidence threshold 126 is described in greater detail below.

In some examples, the computing device 104 includes a wakeup event manager 130 that is configured to enable the creation of wakeup gesture patterns 110 for use with the pen device 102 and to enable the adjustment of confidence threshold 126 and/or wakeup gesture patterns 110 to improve the accuracy and efficiency of the wakeup operations described herein based on user feedback obtained after wakeup events are processed. For instance, the wakeup event manager 130 may be configured to provide a user with an interface by which the user can request to create a new wakeup gesture pattern 110. The computing device 104 and pen device 102 may then be transitioned to a wakeup gesture pattern learning state, such that the user can input the desired wakeup gesture pattern into the pen device 102 (e.g., pressing buttons, activating pressure sensors, moving and/or tapping the pen device 102, etc.). The wakeup event manager 130 obtains the new gesture input data and defines a new wakeup gesture pattern based thereon. In addition to storing the new wakeup gesture pattern on the computing device, the wakeup event manager 130 also uploads the new wakeup gesture pattern to the pen device 102 for use in detecting future wakeup events.

In some examples, the wakeup event manager 130 is further configured to include a machine learning component configured to adjust the wakeup gesture patterns 110, confidence threshold 126, and/or methods of calculating confidence values 125 based on user input associated with wakeup events as feedback data. For instance, the wakeup event manager 130 may analyze patterns of intended wakeup events, unintended wakeup events, failed wakeup event attempts (e.g., when the user tries to trigger a wakeup event and the pen device 102 and/or the computing device 104 fail to perform the wakeup event process, etc.) to tune the wakeup gesture patterns 110, the confidence threshold 126, and/or the method of calculated confidence values 125 for improved efficiency in identifying and triggering wakeup events based on pen device 102 sensor input (e.g., adjusting the wakeup gesture patterns to reduce unintended wakeup events and/or increase accuracy in identifying intended wakeup events, etc.). Further, the wakeup event manager 130 may be configured to recommend adjustments for aspects of the system 100 based on user responses to wakeup events as feedback data. For instance, the wakeup event manager 130 may identify a wakeup gesture pattern 110 that is associated with a high frequency of unintended wakeup events and/or a wakeup gesture pattern 110 that causes a user to attempt to trigger a wakeup event multiple times in a row before the wakeup event is actually triggered (e.g., the wakeup gesture pattern 110 may have margins of error that are too narrow or it may be too difficult to recreate, etc.). Any and/or all of these aspects may cause a wakeup gesture pattern 110 and/or a confidence threshold 126 to be flagged by the wakeup event manager 130 as being likely to cause inefficient and/or inaccurate wakeup event performance. The wakeup event manager 130 may further notify users of the flagged wakeup event gesture patterns 110 and encourage users to consider changes and/or improvements for the flagged wakeup event gesture patterns 110 (e.g., the wakeup event manager 130 may send an automated notification message on the computing device 104 to a user, etc.).

In some examples, the machine learning module of the wakeup event manager 130 comprises a trained regressor such as a random decision forest, directed acyclic graph, support vector machine, neural network, or other trained regressor. The trained regressor may be trained using the feedback data described above. Examples of trained regressors include a convolutional neural network and a random decision forest. It should further be understood that the machine learning module, in some examples, may operate according machine learning principles and/or techniques known in the art without departing from the systems and/or methods described herein.

Alternatively, or additionally, the machine learning module of the wakeup event manager 130 may also include a classifier as would be understood by a person of ordinary skill in the art of machine learning techniques.

In an example, the machine learning module of the wakeup event manager 130 may make use of training data pairs when applying machine learning techniques and/or algorithms. Millions of training data pairs (or more) may be stored in a machine learning data structure. In some examples, a training data pair includes a timestamp-based feedback data value paired with a value adjustment value. The pairing of the two values demonstrates a relationship between the feedback data value and the adjustment values that may be used by the machine learning module to determine future value adjustments according to machine learning techniques and/or algorithms. The data used for training may be data collected from a single user or data collected from a plurality of users. A machine learning algorithm of the machine learning module may be applied to data immediately or it may be applied to "offline" sets of data on a defined interval or based on other execution triggers, such that adjusted or tuned patterns or other affected aspects of the system are updated within the system at a later time relative to when the associate wakeup events occur.

It should be understood that, in some examples, the matching of the gesture input data 108 to the wakeup gesture patterns 110 is considered sufficient to indicate a wakeup event and the computing device 104 does not perform any additional wakeup event verification (e.g., the generation of a confidence value 125 and comparison of that value 125 to the confidence threshold 126, etc.). Alternatively, the pen device 102 may perform little or no gesture input data verification (e.g., comparison of input data 108 to the wakeup gesture patterns 110, etc.) and/or the wakeup gesture patterns 110 may be configured to be relatively broad (e.g., coarse detection and/or verification decisions regarding wakeup events, etc.), such that most or all of the verification of the wakeup event is performed at the computing device 104 by the wakeup message verifier 124 (e.g., fine or more precise detection and/or verification decisions regarding wakeup events, etc.) as described herein. In a further example, the pen device 102 is configured to stream raw sensor data, compressed sensor data, and/or other gesture input data to the computing device 104 constantly or at short, regular intervals and the computing device 104 is configured to perform detection and/or verification of wakeup events based on the streamed data. However, such an implementation may result in undesirable levels of power consumption by the pen device 102 and/or the computing device 104.

Figure 3A:
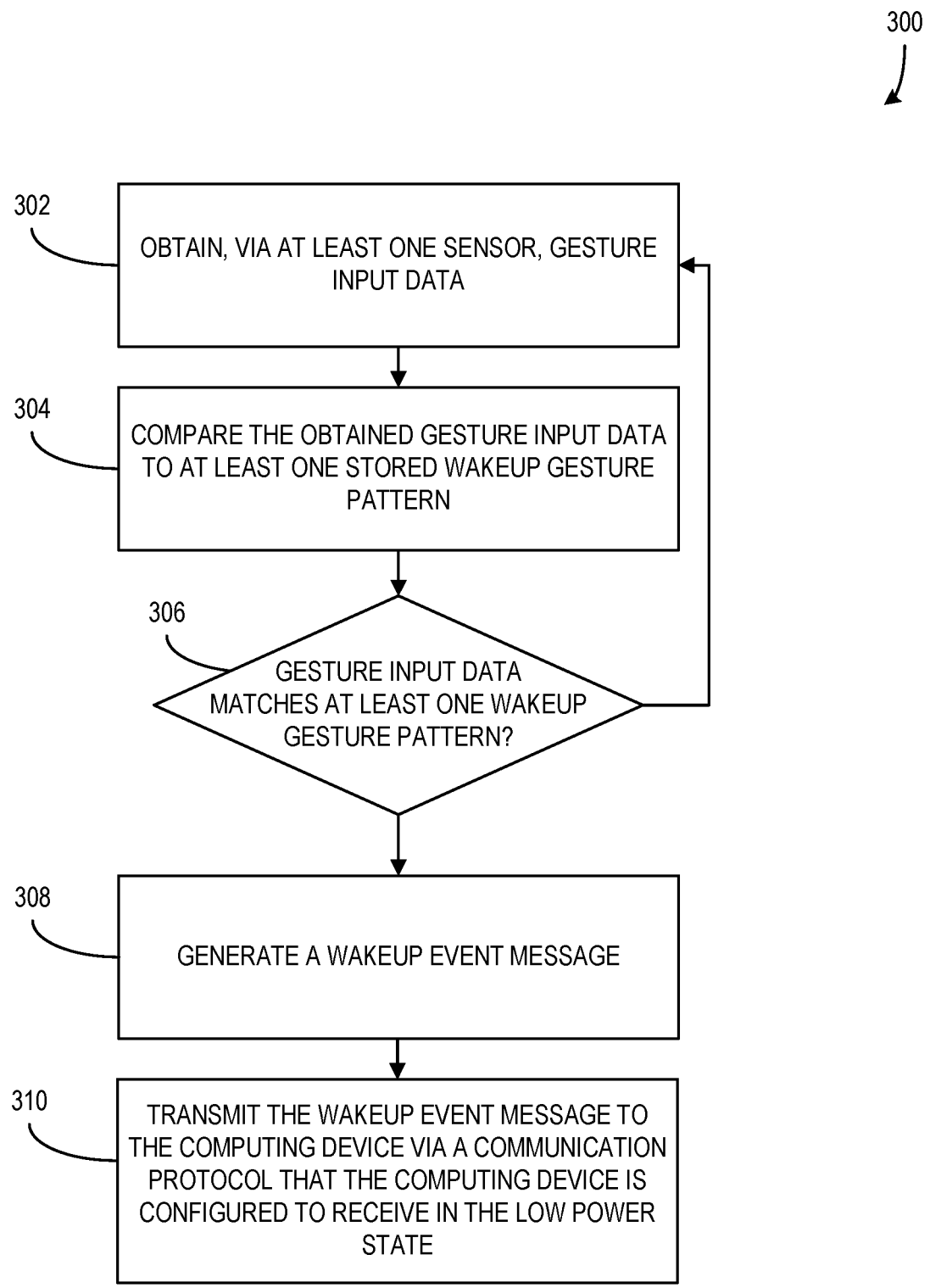
FIGS. 3A and 3B are exemplary flow charts illustrating a pen device being used to generate and transmit a wakeup event message to a computing device to transition the computing device out of a low power state and/or detect an uplink signal from a computing device and sending a signal to change a mode of operation of the computing device according to an embodiment.
Figure 3B:
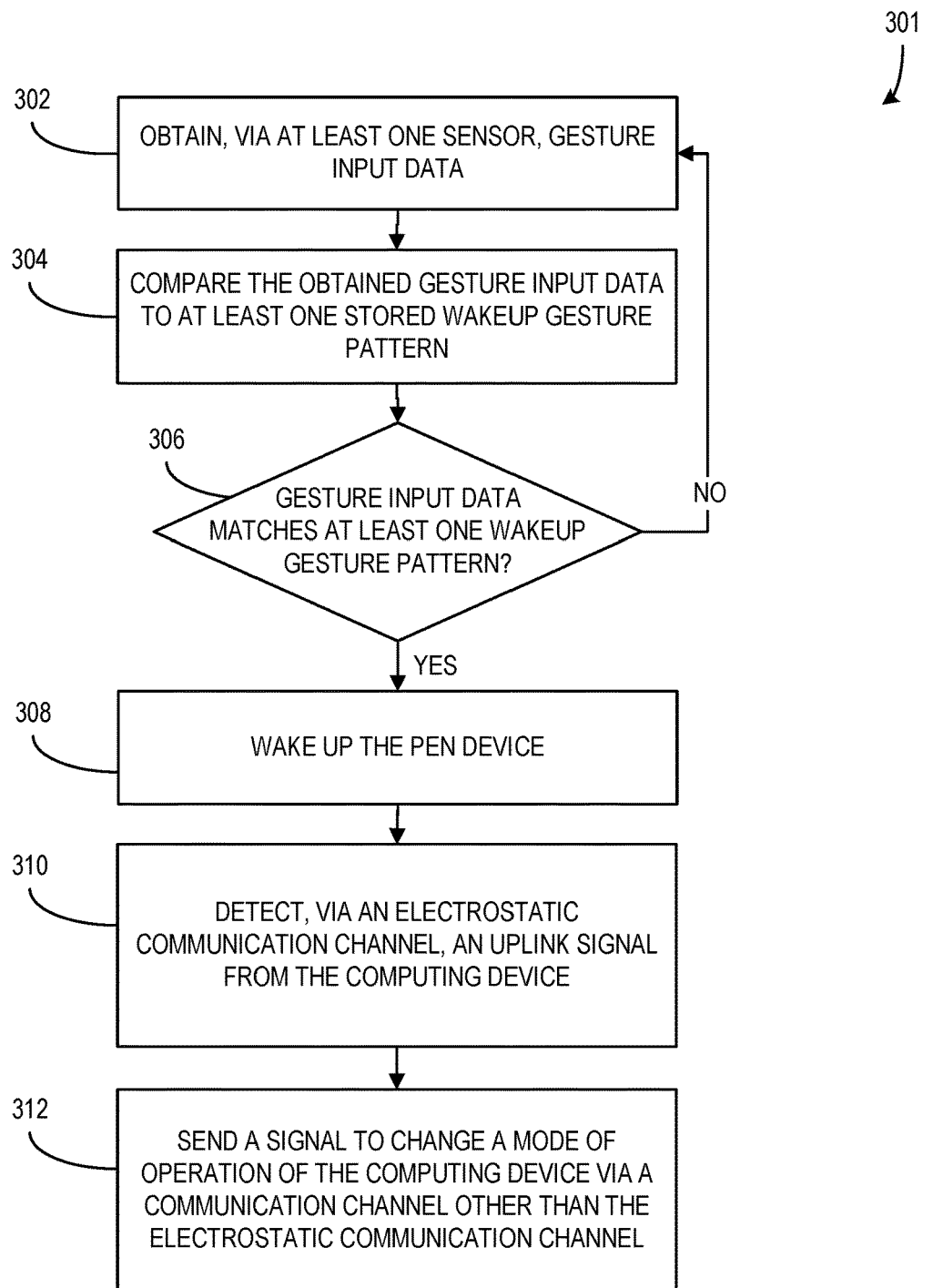

FIGS. 3A and 3B are exemplary flow charts illustrating a pen device being used to generate and transmit a wakeup event message to a computing device to transition the computing device out of a low power state and/or detect an uplink signal from a computing device and sending a signal to change a mode of operation of the computing device according to an embodiment. FIG. 3A is an exemplary flow chart 300 illustrating a method of a pen device (e.g., pen device 102, etc.) being used to generate and transmit a wakeup event message (e.g., wakeup event message 113, etc.) to a computing device (e.g., computing device 104, etc.) to transition the computing device out of a low power state and into a non-low power state (e.g., a high or higher power state), according to an embodiment. At 302, the pen device obtains, via at least one sensor, gesture input data. Obtaining gesture input data may be performed constantly and/or at consistent intervals as long as the pen device is powered on and/or active. Alternatively, or additionally, the pen device may be configured to activate and/or deactivate the obtaining of gesture input data depending on the state of the computing device. For instance, upon entering a low power state, the computing device may be configured to send a message to the pen device that causes the pen device to activate gesture input capture for the purpose of detecting wakeup events and, upon the computing device entering another state from a low power state, the computing device may be configured to send a message to the pen device that causes the pen device to deactivate gesture input capture for the purpose of detecting wakeup events. Further, such activations and/or deactivations may be based on defined time intervals (e.g., the computing device may cause the pen device to deactivate gesture input capture for wakeup events for a defined time period after transitioning out of a low power state (e.g., 1 minute, 5 minutes, etc.), etc.).

As described above, obtaining gesture input data may include obtaining data points from multiple sensors of the pen device (e.g., pressure sensors, IMUs, buttons, switches, capacitive sensors, microphones, etc.). In some examples, gesture input data capture may be limited to data from the sensors that are included in the current set of wakeup gesture patterns (e.g., wakeup gesture patterns 110, etc.). For instance, if none of the wakeup gesture patterns include data from a particular button on the pen device, obtaining gesture input data may not include collecting input data from the particular button, as such input data is not useful for comparison to the wakeup gesture patterns.

At 304, the obtained gesture input data is compared to at least one stored wakeup gesture pattern. The pen device may include one or more wakeup gesture patterns that trigger wakeup events as described herein. Comparing the obtained gesture input data to the patterns may include comparing specific data points of the obtained gesture input data to data points in the patterns, including accounting for any acceptable margins of error that may be included in the patterns. Further, timing of the data points of the gesture input data may be compared to timing requirements of the patterns in a similar fashion, as described above.

At 306, if the gesture input data matches at least one wakeup gesture pattern, the process proceeds to 308. Alternatively, if the gesture input data does not match at least one wakeup gesture pattern, the process returns to 302 to obtain any additional gesture input data from the sensors of the pen device.

At 308, the pen device generates a wakeup event message. The wakeup event message may include an indicator and/or code that indicates that a wakeup event has been triggered. Further, the wakeup event message may be generated to include some or all of the gesture input data (e.g., raw sensor data and/or gesture input data that may have been processed from raw sensor data, etc.). Including the gesture input data on the wakeup event message may enable the computing device to perform a separate analysis and/or verification of the wakeup event as described herein with respect to calculating a confidence value of the wakeup event.

At 310, the wakeup event message is transmitted to the computing device via a communication protocol. The pen device is configured to transmit the wakeup event message using a communication protocol that the computing device can receive while in a low power state. In some examples, the wakeup event message is transmitted to the computing device via a BLUETOOTH connection between the pen device and the computing device. The transmission of the wakeup event message may be timed based on a defined latency setting of the pen device and/or the computing device (e.g., the computing device may be configured to only receive wakeup event messages at a high latency, such as a one second latency (receiving message(s) once per second) in order to preserve the low power consumption of the low power state of the computing device, etc.).

In some examples, operations 304 and 306 are performed on the computing device. The gesture input data is sent to the computing device as part of the wakeup event message, and the computing device compares the gesture input data to the wakeup gesture pattern stored on the computing device, while the computing device remains in the low power state. If the gesture input data matches the wakeup gesture pattern, the computing device may perform operations to transition out of the low power state to an active state or other non-low power state.

FIG. 3B is an exemplary flow chart 301 illustrating a method of the pen device (e.g., pen device 102, etc.) waking up from a low power state based on a detected gesture, detecting the presence of the computing device (e.g., computing device 104, etc.) via an electrostatic communication channel, and sending a signal to the computing device to change a mode of operation via the same or another communication channel. Operations 302-306 are substantially the same as described above with respect to FIG. 3A.

At 308, the pen device wakes up from a low power state based on the gesture input data matching at least one wakeup gesture pattern. In some examples, the pen device is configured to detect gesture input data despite being in a low power state, enabling this described functionality. Waking up from the low power state by the pen device may include activating network communication capabilities and/or electrostatic signal detection and communication capabilities for use in the remaining processes of flow chart 301. Such capabilities may include, for instance, BLUETOOTH communication capabilities and/or electrostatic detection capabilities for detecting electrostatic signals from a digitizer of the computing device.

At 310, the pen device detects, via an electrostatic communication channel, an uplink signal from the computing device, such as when the computing device is unable to detect an electrostatic downlink signal from the pen device or when the computing device is able to detect a downlink signal but is not required to detect such a signal. In some examples, pen devices proximate to computing device are capable of communicating with one or more digitizers of the computing devices via electrostatic communication. The timing of the pen devices and computing devices may be asynchronous (e.g., the pen device's timing is not initially synchronized with the digitizer's timing, etc.) or synchronous (e.g., the pen device's timing is synchronized with the digitizer's timing, etc.). In embodiments where the timing is initially asynchronous, the digitizer of a computing device may be configured to search for pen signals and, when such electrostatic signals are received from pen devices, the digitizer may be configured to change its timing to be synchronized with the pen device such that the digitizer is enabled to capture all signals from the pen device and to send pen reports to the operating system and/or applications.

In some examples, the range at which the digitizer of a computing device can detect a pen device via electrostatic communication differs from the range at which the pen device can detect the digitizer of the computing device. For instance, the range for the digitizer to detect the pen device (e.g., via a downlink signal from the pen device, etc.) may be approximately 15 mm away from the screen of the computing device, while the range for the pen device to detect the digitizer (e.g., via an uplink signal from the digitizer, etc.) may be approximately 30-40 mm away from the screen of the computing device. The effective ranges of downlink and uplink signals may be affected by the signal-to-noise ratio (SNR) of the signals and/or the amount of power used to generate the signal (e.g., the digitizer may use more power to generate the uplink signal than the pen device uses to generate the downlink signal, etc.). At 310, the detecting of the uplink signal by the pen device may occur when the pen device is within range of detecting the uplink signal from the digitizer of the computing device but still out of range of the digitizer of the computing device detecting a downlink signal from the pen device. In some examples, the detection of the digitizer by the pen device at such an extended range may be used to more efficiently respond to potential interaction between the pen device and computing device as described herein. It should be understood that, in some examples, the computing device may be physically capable of detecting a downlink signal from the pen device but configured to attempt to detect downlink signals in order to save power, processing resources, or for other reasons without departing from the description herein.

In some examples, the uplink signal detected by the pen device may include timing information associated with the digitizer of the computing device, enabling the pen device to synchronize with the digitizer and/or computing device upon detecting the uplink signal. Further, the pen device may change its operation mode based on detecting the uplink signal (e.g., by increasing the strength of a transmitted downlink signal, increasing transmission durations or frequency, etc.) to enable faster acquisition by the digitizer of the computing device. The uplink signal from the digitizer may be configured in such a way that the pen device calculates a location of the pen device in relation to the digitizer and/or a "hover height" of the pen device above the digitizer. Such calculations may be based on uplink signal strength, data provided in the uplink signal, and/or other aspects of the uplink signal. The calculated location may be communicated to the computing device and changes to a mode of operation of the computing device as described below may depend on the calculated location (e.g., the UI of the computing device may change to become pen-friendly when the pen device is within a defined distance from the digitizer, etc.).

Alternatively, or additionally, prior to detecting the electrostatic uplink signal, the pen device may communicate with the computing device via another communication channel (e.g., a BLUETOOTH channel, or other channel with a longer range than electrostatic, etc.) to request that the computing device transmit uplink signals if it is not already doing so. Such a request may be sent based on the pen device itself detecting gesture input to the pen device and/or based on another type of input to the pen device.

At 312, the pen device sends a signal to change a mode of operation of the computing device via a communication channel other than the electrostatic communication channel after detecting the uplink signal. The communication channel may include a connection over a network interface, such as via a BLUETOOTH protocol as described herein. Other possible communication channels may be used without departing from the description, such as low power communication channels with ranges longer than an electrostatic channel. In some examples, the signal from the pen device may include a pen identifier of the pen device and/or timing information for use by the computing device to synchronize to the signals of the pen device.

The change of a mode of operation of the computing device may include changes to a power state of the computing device (e.g., transitioning the computing device from a low power state to an active state as described herein, etc.), changes to how the pen device is detected and/or signaled, and/or changes to interfaces, operating system operations, and/or application operations with respect to the pen device based on the detected proximity of the pen device. For instance, the operations of the computing device may include changing the interface of a display screen to accommodate a user writing or drawing with the pen device and/or configuring the digitizer and/or other components of the computing device to capture inking (e.g., writing and/or drawing, etc.) input from use of the pen device. In some examples, because the pen device detects the uplink signal at a greater range than the digitizer detects the downlink signal, the computing device has more time to transition operations to capture pen device inking input such that the computing device is more likely to capture all writing or drawing input rather than possibly failing to capture initial inking input based on waiting for detection of the downlink signal from the pen device. Other changes to operation modes may include display of pen-specific menus or other pen-related user interface components, waking the computing device or otherwise changing a power state of the computing device, starting or resuming a pen-related application, etc.

Alternatively, or additionally, the change of mode of operation of the computing device may include pairing or otherwise configuring the computing device and/or pen device for further communication and/or interaction (e.g., BLUETOOTH pairing to enable further communication over a BLUETOOTH connection, etc.). Such a pairing may be performed by the computing device and/or pen device as an initial pairing process when the pen device and computing device have not been paired previously or associated pairing history data has been erased, etc. Alternatively, when the computing device and pen device have been paired previously, the change of mode of operation of the computing device may include restoring the paired state of the computing device and pen device.

In some examples, the process described by 310-312 may be performed independently from the process described by 302-308, as long as the computing device and pen device are capable of communicating via electrostatic signals and another communication channel as described. For instance, if the computing device and pen device have previously interacted to exchange gesture data, the process described by 310-312 may later be performed using the electrostatic signal(s) and previously established communication channel or channels. In some embodiments, the pen device may not be configured to actively scan for electrostatic uplink signals until a gesture and/or other input are detected by the pen device. For instance, the pen device may be configured to remain in an inactive state (e.g., not scanning for uplink signals, reduced frequency of signal transmission, etc.) to save battery power until gesture input is detected. After detecting a gesture, the pen device may transition to an active state and detect the electrostatic uplink signals as described herein. In this manner, the disclosure leverages distinct communication paths between the pen device and the computing device to gain benefits such as fast acquisition time and in-accurate in-range reporting. The first acquisition time between pen device and the computing device determines and impacts the pen device performance. For example, if the acquisition time is long, and the pen device is acquired only after contacting the screen of the computing device, the impact may be missing the first strokes of input from the pen device, resulting in a poor user experience (e.g., degraded handwriting or drawing quality in an inking application) or degraded navigation experience through one or more applications (e.g., if the pen device is used for such navigation). In addition, knowing that the pen device is in-range (e.g., even if the exact location of the pen device is not known) is advantageous and facilitates certain features on the computing device. For example, a pen-specific menu is displayed if the pen device is expected to be used.

Figure 4:
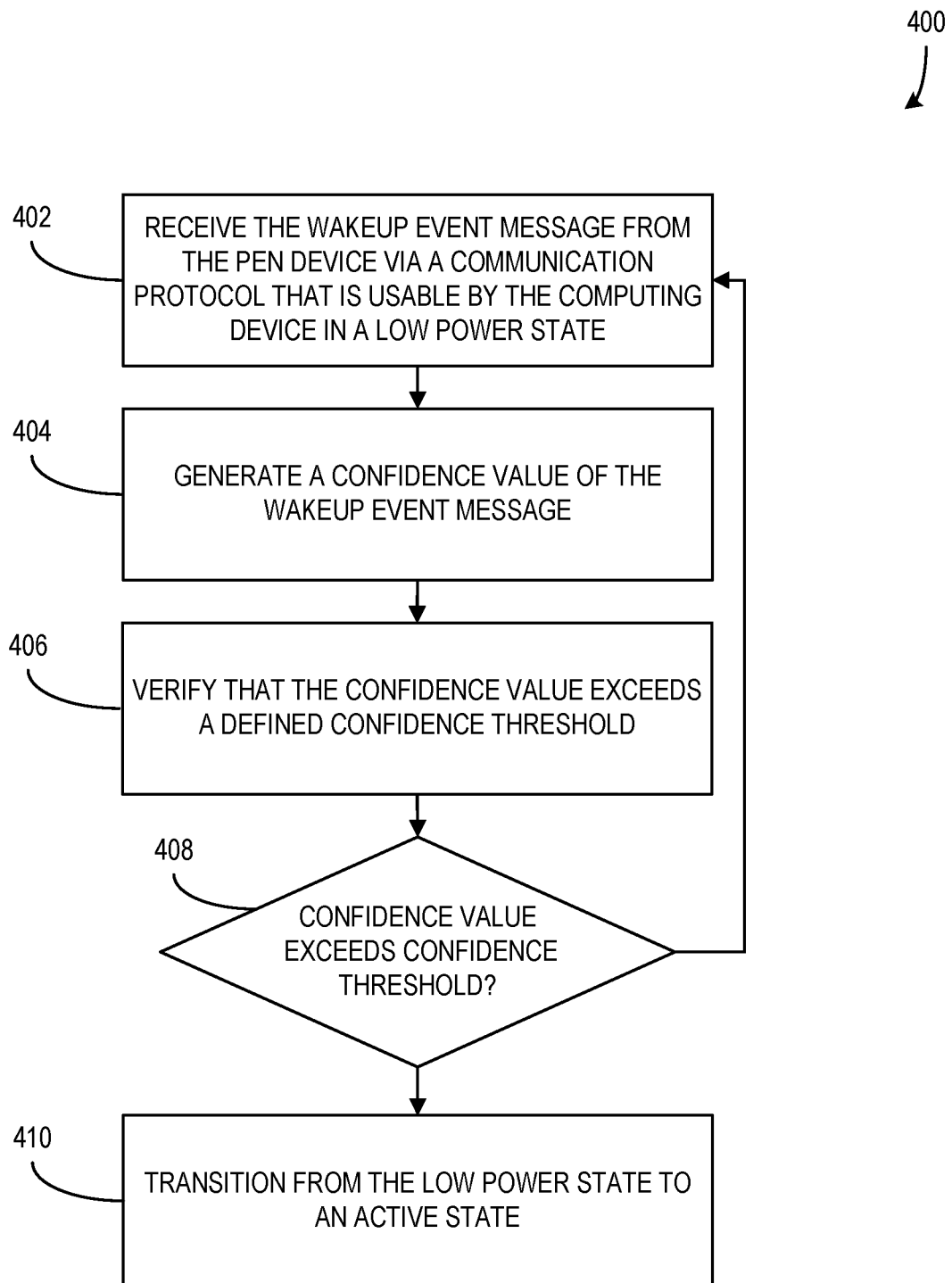
FIG. 4 is an exemplary flow chart illustrating a computing device receiving a wakeup event message and transitioning out of a low power state when the wakeup event message is verified according to an embodiment.

FIG. 4 is an exemplary flow chart 400 illustrating a computing device (e.g., computing device 104, etc.) receiving a wakeup event message (e.g., wakeup event message 113, etc.) and transitioning out of a low power state when the wakeup event message is verified according to an embodiment. The process of flow chart 400 may be performed by a computing device that is currently in a low power state (e.g., a "sleep" state, a "suspend" state, etc.). The verification process below may enable the computing device to make a more precise verification of the wakeup event due to the computing device having access to more and/or different data, greater processing resources and capabilities, and/or more sophisticated algorithms than the pen device. If the computing device is already in a state other than a low power state (e.g., an active state, a default state, etc.), the computing device may be configured to ignore wakeup event messages that are received or otherwise configured to not receive wakeup event messages (e.g., "timeout" the gesture detection mechanism using the associated radio network connection or electro-static uplink, etc.). Further, as described above, the computing device may be configured to cause the pen device to disable the generation of wakeup events when the computing device is not in a low power state. At 402, the computing device receives the wakeup event message from the pen device via a communication protocol (e.g., via a BLUETOOTH connection, etc.) that is usable by the computing device in a low power state.

At 404, the computing device generates a confidence value of the wakeup event message. The confidence value may be a continuous number that is calculated by a regression or soft decision engine based on factors associated with data that is included in the wakeup event message (e.g., gesture input data such as raw or compressed sensor data, etc.), sensor data collected by the computing device (e.g., from sensors 121, etc.), and/or context data associated with the wakeup event message (e.g., when the message is received, results of other messages that have been recently received, etc.). Each factor that is used to calculate the confidence value may include a defined weight indicating at degree to which the factor influences the calculated confidence value. For instance, a factor with a weight of 0.1 may influence the confidence value less than a factor with a weight of 0.5 (e.g., weight values may be applied to associated factor values by multiplication and resulted weighted factor values may be combined by summation or the like, etc.).

In some examples, the confidence value is calculated based on the degree to which the input data from the wakeup event message and/or sensor data from the sensors (e.g. sensors 121, etc.) of the computing device matches wakeup gesture patterns that are stored on the computing device (e.g., these wakeup gesture patterns may be the same as those stored on the pen device, they may include additional or different patterns based on sensor data of the computing device, or they may include patterns based on a combination or fusion of data from the pen device and the sensor data of the computing device, etc.). The confidence value may be inversely affected by the degree to which the input data differs from wakeup gesture patterns (e.g., if the input data differs from the wakeup gesture patterns by 10% or less, a factor value of 10 may be included in the confidence value and, if the input data differs from the wakeup gesture patterns by 30% or more, a factor value of 3 may be included in the confidence value, etc.). Factor values included in the confidence value may be configured as ranges of possible values (e.g., a factor value from 0-10, etc.), binary values (e.g., a factor value of 0 or a factor value of 10, etc.), and/or any other combination of types of values without departing from the description herein.

Further, the confidence value may be calculated based on other context data associated with the received wakeup event message. For instance, if the wakeup event message is received within a timeframe when the computing device is typically in use by a user, the confidence value may be higher than if the message is received within a timeframe when the computing device typically remains in a low power state for an extended period (e.g., the computing device being in a "sleep" state overnight, etc.). In another example, if the computing device has recently received consistent, false wakeup event messages (e.g., the pen device is being carried while the user walks, resulting in motion that may cause false wakeup event messages to be generated, etc.) the confidence value may be lower than if the message is received when the pen device has otherwise been relatively still.

At 406, the computing device verifies that the confidence value exceeds a defined confidence threshold to generate a hard decision regarding whether the wakeup event is true or false. The confidence threshold may be a single value that is defined in the context of the methods that are used to calculate confidence values as described above (e.g., if confidence values may be generated within the range of 0 to 100, a confidence threshold may be defined to be 85 on that confidence value scale, etc.). The confidence threshold may be a default value and/or it may be set by a user of the computing device. In some examples, the confidence threshold and/or other aspects of calculating the confidence values as described above may be adjusted based on feedback as described herein with respect to machine learning.

At 408, if the confidence value exceeds the confidence threshold, the process proceeds to 410. Alternatively, if the confidence value does not exceed the confidence threshold, the process returns to 402. When the confidence value does not exceed the confidence threshold, the wakeup event message may be ignored by the computing device. Alternatively, the computing device may provide a message to the pen device in response that notifies the pen device that the recent message was likely to be false. Such a notification may cause the pen device to return to obtaining gesture input data, rather than, for instance, disabling the collection of gesture input data in the case that the computing device has transition from the low power state.

At 410, the computing device transitions from the low power state to an active state. The transition between a low power state and other states is well understood in the art (e.g., "waking up" a computing device that is in a "sleep" state or a "suspend" state, etc.). The transition may include the activation of components and/or applications that were disabled in the low power state and/or changing components and/or applications that were in a low power consumption mode to an active mode, default mode, or other mode that may cause the component and/or application to consume additional power (e.g., in exchange for improved performance, etc.).

In some examples, the transition may also include the execution of one or more applications, such as applications that may be specific to the method of the wakeup event being detected (e.g., if the wakeup event is detected by sensors of the pen device as described herein, the computing device may be configured to execute an application that enables the user to write or draw with the pen device, such as a document generation application or an image editing application, etc.).

Figure 5:
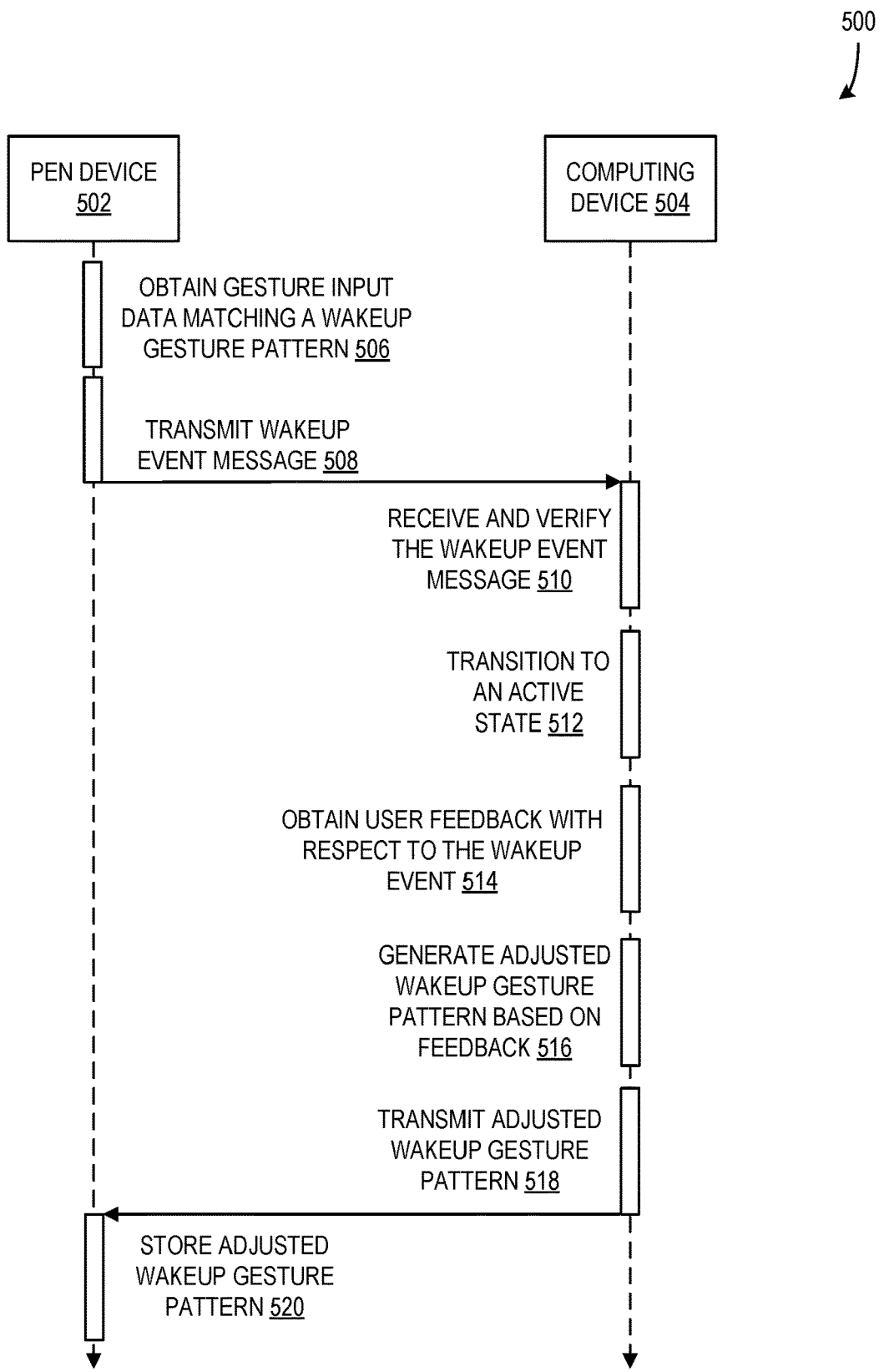
FIG. 5 is an exemplary sequence diagram illustrating the interaction between a pen device and computing device including adjusting a wakeup gesture pattern based on user feedback according to an embodiment.

FIG. 5 is an exemplary sequence diagram 500 illustrating the interaction between a pen device 502 and computing device 504 including adjusting a wakeup gesture pattern based on user feedback according to an embodiment. It should be understood that the computing device 504 is in a low power state as described herein at the beginning of the time period described by the diagram 500. At 506, the pen device 502 obtains gesture input data matching a wakeup gesture pattern and at 508, the pen device 502 transmits a wakeup event message associated with the gesture input data to the computing device 504. The processes at 506 and 508 may be performed in substantially the same manner or a similar manner as described above with respect to FIGS. 3A and 3B.

At 510, the computing device receives and verifies the wakeup event message and at 512, as a result of the wakeup event message being verified, the computing device transitions to an active state. The processes at 510 and 512 may be performed in substantially the same manner or a similar manner as described above with respect to FIG. 4.

At 514, the computing device 504 obtains user feedback with respect to the wakeup event. The user feedback may be obtained by the computing device 504 prompting a user of the computing device 504 to confirm or deny whether a wakeup event was intended. In some cases, the user may have inadvertently triggered a wakeup event based on sensor data provided to the pen device 502, causing the computing device 504 to wake up at an unintended time. In response to the prompting of the computing device, the user may indicate that the wakeup event was unintentional and the computing device 504 may be configured to log the user feedback response and then return to a low power state. Alternatively, the user may have intended to trigger the wakeup event and, in response to prompting, may confirm that the wakeup event was intentional. In that case, the computing device 504 may be configured to log the user feedback response and continue with operation in the current active state.

Alternatively, or additionally, the user's immediate interaction with the computing device 504 upon transitioning to the active state may be obtained as user feedback with respect to the wakeup event. For instance, if, after transitioning to the active state at 512, the user of the computing device 504 immediately selects to transition the computing device 504 back to the low power state, the user's selection may be treated as user feedback that the transition to the active state was incorrectly triggered. Further, if the user immediately begins using the computing device 504, the user's actions may be treated as user feedback that the transition to the active stat was correctly triggered.

In some examples, the computing device 504 is configured to obtain user feedback after only a subset of wakeup events. For instance, if, during verification of the wakeup event message at 510, a calculated confidence value of the wakeup event is found to substantially exceed a defined confidence threshold (e.g., the confidence value exceeds the confidence threshold by a defined amount and/or a defined percentage of the confidence threshold, etc.), user feedback may not be obtained, as the wakeup event is very likely to have been intended by the user. Alternatively, if the calculated confidence value is found to be close to the defined confidence threshold (e.g., the confidence value is within a defined amount of the confidence threshold and/or a defined percentage of the confidence threshold, etc.), the user may be prompted to provide feedback or feedback may be otherwise obtained from the user, as the wakeup event may have been unintended.

At 516, the computing device 504 generates an adjusted wakeup gesture pattern based on the user feedback. In some examples, the adjustments are made to the wakeup gesture pattern that caused the wakeup event to be triggered. Adjustments made may include changes to margins of error of the wakeup gesture pattern to make it more or less likely for gesture input to match the pattern. For instance, if the wakeup event is determined to be unintentional based on the user feedback, the margins of error of the associated wakeup gesture pattern may be reduced (e.g., ranges of values that match to a pattern value may be reduced, time intervals for matching to a pattern may be shortened, etc.). Alternatively, or additionally, the margins of error of the associated wakeup gesture pattern may be expanded if user feedback indicates that the user attempted to trigger a wakeup event but the wakeup event was not triggered due to the sensor input failing to match the wakeup gesture pattern.

In some examples, the user feedback is used to adjust the confidence threshold(s) associated with the computing device 504 and/or the manner in which confidence values are calculated as described herein. Similar to adjusting the wakeup gesture patterns, confidence thresholds and/or confidence value calculations may be adjusted to make it more or less likely that a wakeup event will be triggered.

At 518, the computing device 504 transmits the adjusted wakeup gesture pattern 518 to the pen device 502. The transmission may be over the same network connection as the transmission of the wakeup event message at 508. Alternatively, or additionally, because the computing device 504 has transitioned to an active state, the computing device 504 may be configured to transmit the adjusted wakeup gesture pattern to the pen device 502 via different network protocol, such as a protocol that may have been disabled when the computing device 504 was in the low power state.

At 520, the pen device 502 receives the adjusted wakeup gesture pattern and stores it along with any other wakeup gesture patterns associated with the pen device 502. The adjusted wakeup gesture pattern may overwrite the previous version of the adjusted wakeup gesture pattern, such that the adjusted wakeup gesture pattern is used to identify wakeup events based on future gesture input data.

Alternatively, or additionally, the computing device 504 may be configured to send feedback data associated with wakeup event messages to the pen device 502 and the pen device 502 may be configured to adjust wakeup gesture patterns based on the sent feedback data. The feedback data sent back to the pen device 502 may include labels or identifiers associated with the wakeup event messages, the computing device 504, and/or associated sensor data or other data used by the computing device 504 during verification. For instance, wakeup events that are found to be false at the computing device 504 may result in a false wakeup event message associated with the wakeup event message being sent to the pen device 502. The pen device 502 may then tune or adjust the associated wakeup gesture pattern based on machine learning principles and/or techniques as described herein. Positive results (e.g., wakeup event messages that are found to be true and/or accurate, etc.) may be sent to the pen device 502 to be applied to the wakeup gesture patterns as well. While some pen devices may not include processing resources necessary for such an implementation, in systems with pen devices capable of such processing, the reliance on the computing device for pattern tuning may be reduced.

Additional Example Scenarios

Aspects of the disclosure enable various additional scenarios, such as next described.

In an example, a user has a computing device with a pen device that is in a sleep state. The user picks up the pen device and taps the tip of the pen device twice in quick succession on a nearby surface. The pen device includes a pressure sensor on the tip that detects the two taps as gesture input data. The pen device compares the detected taps to a wakeup gesture pattern that is stored on the pen device. The wakeup gesture pattern includes two taps separated by 0.5 seconds and including a 20% margin of error with respect to the timing of the taps. The pen device determines that the detected taps match the wakeup gesture pattern with in the defined margin of error. A wakeup event message is generated and transmitted to the computing device using a BLUETOOTH network connection.

The computing device receives the wakeup event message and calculates a confidence value based on the data included in the message as well as other context data associated with the receipt of the message. The computing device verifies the message when the confidence value exceeds a defined confidence threshold and, based on the verification, the computing device transitions from the sleep state to an active state. Once the computing device transitions to the active state, the user begins working on the computing device.

In another example, the user defines a new wakeup gesture pattern for use with the pen device to wake up the computing device. The new wakeup gesture pattern includes pressing the tip of the pen to a surface and moving the pen in a circular motion, as if drawing a circle on the surface. The data associated with the wakeup gesture pattern includes input data from the pressure sensor in the tip of the pen device and movement data for an IMU in the pen device. The user further defines that, when the new wakeup gesture pattern is used to wake up the computing device, the computing device should also activate the user's favorite note-taking application, enabling the user to quickly and intuitively access the application starting from the computing device being in a sleep state.

Another example contemplates the user's computing device being in a low power state and the user wants to use the note-taking application. The user picks up the pen device and attempts to perform the new wakeup gesture pattern by pressing the pen device tip to a table surface and moving it in a circular pattern. The pen device obtains the input data from the pressure sensor and the IMU, but, based on the margin(s) of error associated with the new wakeup gesture pattern, the pen device determines that the movement input does not sufficiently match the defined pattern. Upon seeing that the computing device did not wakeup, the user tries to perform the pattern again. This time, the input data matches the defined pattern and a wakeup event message is transmitted to the computing device, including the input data and an identifier of the pattern that was matched. The computing device verifies the message and transitions to an active state. Based on the pattern that was matched, the computing device then initiates the note-taking application associated with the wakeup gesture pattern for use by the user. The user begins using the note-taking application immediately.

The computing device collects context data associated with the recent wakeup event, including data indicating that the user had previously tried and failed to cause a wakeup event immediately prior to the recent wakeup event. A machine learning component of the computing device determines that the failed attempt prior to the wakeup event indicates feedback that the margin(s) of error associated with the new wakeup gesture pattern are too narrow, making performance of the pattern more difficult than it should be. The machine learning component adjusts the margin(s) of error of the new pattern to widen the range of values that satisfy the pattern and the adjusted pattern is provided to the pen device for use during future wakeup gesture detection.

In other examples, other types of sensor data may be used to detect wakeup events. For instance, a microphone sensor on a pen device may be configured to detect a defined sound, such as a spoken word or phrase, that causes the pen device to initiate a wakeup event. Further, described types of gestures may be detected by multiple sensors of the pen device (e.g., a tapping of the pen device being detected by a pressure sensor on the tip of the pen device, by an IMU embedded in the device, and/or by a microphone sensor of the pen device, etc.). Types of sensors may include piezo sensors or the like within the pen device that are sensitive to force applied to the pen device to detect a level of grip force used by the user on the pen device, which may be used alone or in combination with other sensor data for triggering a wakeup event.

In still other examples, the system includes detection of pen device gestures for other purposes, such as writing, erasing, activating an application, navigating an interface, etc. The pen device and/or computing device of the system are configured to trigger a wakeup event upon detection of at least one of these other device gestures.

Further, the system may be configured to trigger wakeup events based on detection of wakeup gestures and/or other gestures using broad margins of error at the pen device, such that virtually any detected sensor input data or detected change in sensor input data causes the pen device to transmit a wakeup event message to the computing device. Thus, the computing device is relatively easy to wake up for a user. However, many unintended wakeup events may be triggered at the pen device-level when the user moves around, carries the computing device and/or pen device, etc., so verification at the computing device may be configured and/or tuned to control for the inadvertent events.

Exemplary Operating Environment

Figure 6:
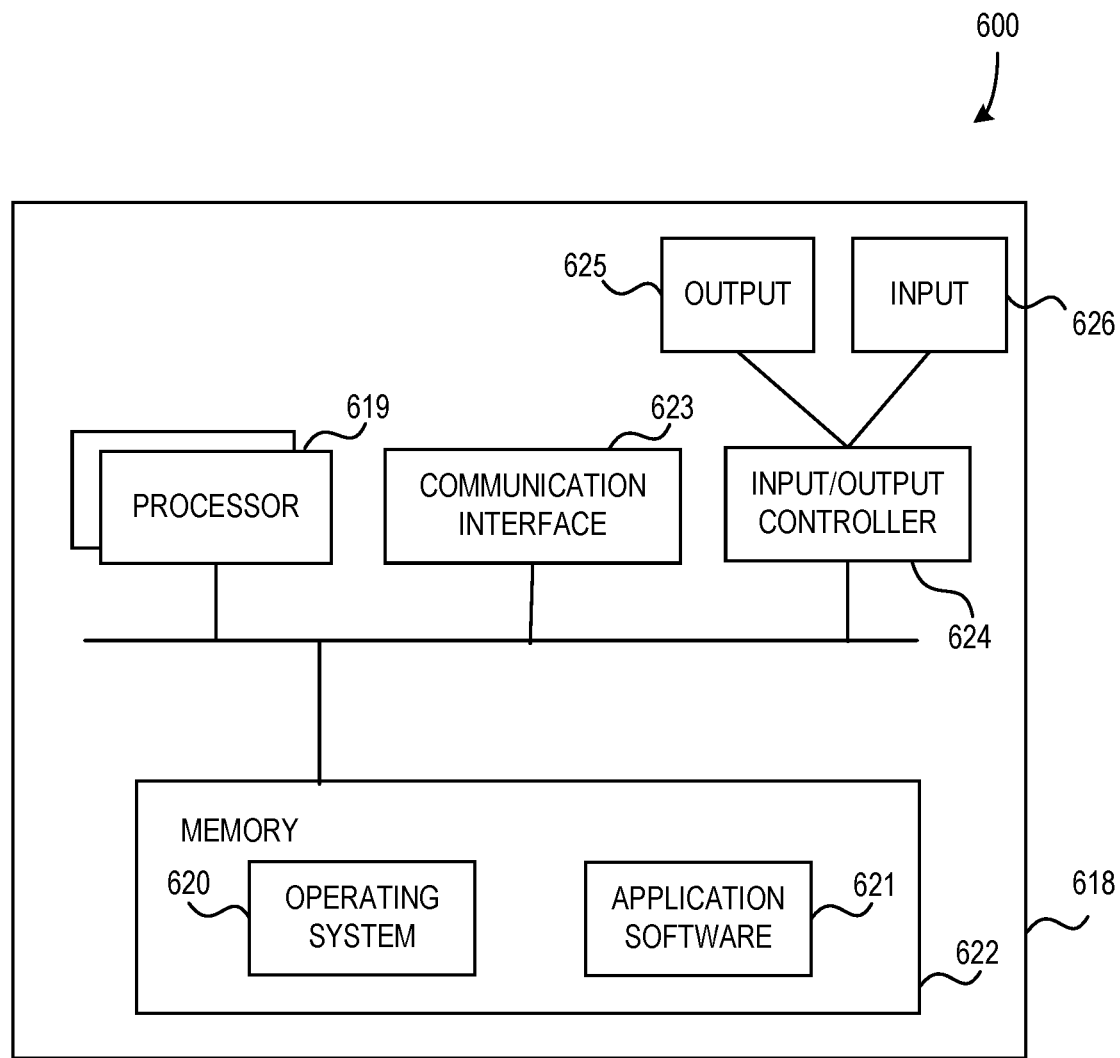
FIG. 6 illustrates a computing apparatus according to an embodiment as a functional block diagram.

The present disclosure is operable with a computing apparatus according to an embodiment as a functional block diagram 600 in FIG. 6. In an embodiment, components of a computing apparatus 618 may be implemented as a part of an electronic device according to one or more embodiments described in this specification. The computing apparatus 618 comprises one or more processors 619 which may be microprocessors, controllers or any other suitable type of processors for processing computer executable instructions to control the operation of the electronic device. Alternatively, or in addition, the processor 619 is any technology capable of executing logic or instructions, such as a hard-coded or hardware machine. Platform software comprising an operating system 620 or any other suitable platform software may be provided on the apparatus 618 to enable application software 621 to be executed on the device. According to an embodiment, causing a computing device to transition from a low power state based on gesture input obtained by a pen device as described herein may be accomplished by software.

Computer executable instructions may be provided using any computer-readable media that are accessible by the computing apparatus 618. Computer-readable media may include, for example, computer storage media such as a memory 622 and communications media. Computer storage media, such as a memory 622, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g. using a communication interface 623).

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone or a touchpad. In one embodiment, the output device 625 may also act as the input device. An example of such a device may be a touch sensitive display. The input/output controller 624 may also output data to devices other than the output device, e.g. a locally connected printing device. In some embodiments, a user may provide input to the input device(s) 626 and/or receive output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition to the other examples described herein, examples include any combination of the following:

A system for causing a computing device to transition from a low power state using a pen device, the system comprising:
at least one processor of the pen device;
at least one network interface of the pen device;
at least one sensor of the pen device; and
at least one memory of the pen device comprising computer program code, the at least one memory and the computer program code configured to, with the at least one processor, cause the at least one processor to:
obtain, via the at least one sensor, gesture input data;
compare the obtained gesture input data to at least one gesture pattern;
based on the gesture input data matching the at least one gesture pattern, generate a wakeup event message; and
transmit, via the network interface, the wakeup event message to the computing device, wherein the wakeup event message is transmitted using a communication protocol that the computing device is configured to receive in the low power state.
further comprising:
at least one processor of the computing device;
at least one network interface of the computing device; and
at least one memory of the computing device comprising computer program code, the at least one memory of the computing device and the computer program code configured to, with the at least one processor of the computing device, cause the at least one processor of the computer device to:
receive the wakeup event message from the pen device via the network interface;
generate a confidence value of the wakeup event message;
compare the confidence value to a defined confidence threshold; and
based on the confidence value exceeding the confidence threshold, transition the computing device from the low power state to an active state.
wherein the at least one memory of the computing device and the computer program code configured to, with the at least one processor of the computing device, further cause the at least one processor of the computer device to:
based on the transition from the low power state to the active state, disable a capability to receive wakeup event messages from the pen device for a defined time interval.
wherein the at least one memory of the computing device and the computer program code configured to, with the at least one processor of the computing device, further cause the at least one processor of the computer device to:
based on the confidence value failing to exceed the confidence threshold, ignore the wakeup event message, whereby the wakeup event message is treated as an unintentional wakeup event.
wherein the at least one memory of the computing device and the computer program code configured to, with the at least one processor of the computing device, further cause the at least one processor of the computer device to:
prompt a user of the computing device for wakeup event feedback via a user interface of the computing device; and
based on receiving wakeup event feedback, adjust a wakeup gesture pattern associated with the wakeup event message based on machine learning; and upload the adjusted wakeup gesture pattern to the pen device.
wherein the at least one gesture pattern includes tapping the pen device against a surface at least one time, wherein the tapping is detected by at least one of an IMU and a pressure sensor of the at least one sensor of the pen device.
wherein the at least one gesture pattern includes moving the pen device in a pattern of one or more movements, wherein the one or more movements are detected by an IMU of the pen device.
wherein obtaining the gesture input data includes:
detecting a first sensor of the pen device being pressed, wherein the first sensor includes at least one of a button, a switch, or a pressure sensor; and
based on the detected pressing of the first sensor of the pen device, obtaining gesture input data from at least one sensor of the pen device other than the pressed first sensor.
wherein the at least one sensor of the pen device includes at least one of an inertial measurement unit (IMU), a button, a switch, a pressure sensor, or a microphone.
A computerized method for causing a computing device to transition from a low power state using a pen device, the method comprising:
obtaining, by the pen device, gesture input data from at least one sensor of the pen device;
comparing, by the pen device, the obtained gesture input data to at least one gesture pattern;
based on the gesture input data matching the at least one gesture pattern, generating, by the pen device, a wakeup event message; and
transmitting, by the pen device, the wakeup event message to the computing device over a network interface of the pen device, wherein the wakeup event message is transmitted using a communication protocol that the computing device is configured to receive in the low power state.
further comprising:
receiving, by the computing device, the wakeup event message from the pen device via a network interface of the computing device;
generating, by the computing device, a confidence value of the wakeup event message;
comparing, by the computing device, the confidence value to a defined confidence threshold; and
based on the confidence value exceeding the confidence threshold, transitioning, by the computing device, from the low power state to an active state.
further comprising:
based on the transition from the low power state to the active state, disabling, by the computing device, a capability to receive wakeup event messages from the pen device for a defined time interval.
further comprising:
based on the confidence value failing to exceed the confidence threshold, ignoring, by the computing device, the wakeup event message, whereby the wakeup event message is treated as an unintentional wakeup event.
further comprising:
prompting, by the computing device, a user of the computing device for wakeup event feedback via a user interface of the computing device; and
based on receiving wakeup event feedback, adjusting, by the computing device, the confidence threshold based on machine learning.

further comprising:
receiving, by the computing device, a request to define a new wakeup gesture pattern;
obtaining, based on the request, new gesture input data from the at least one sensor of the pen device;
defining, by the computing device, a new wakeup gesture pattern based on the obtained new gesture input data; and
uploading, by the computing device, the new wakeup gesture pattern to the pen device.
wherein the at least one gesture pattern includes tapping the pen device against a surface at least one time, wherein the tapping is detected by at least one of an IMU and a pressure sensor of the at least one sensor of the pen device.
wherein the at least one gesture pattern includes moving the pen device in a pattern of one or more movements, wherein the one or more movements are detected by an IMU of the pen device.
wherein obtaining the gesture input data includes:
detecting a first sensor of the pen device being pressed, wherein the first sensor includes at least one of a button, a switch, or a pressure sensor; and
based on the detected pressing of the first sensor of the pen device, obtaining gesture input data from at least one sensor of the pen device other than the pressed first sensor.
One or more computer storage media having computer-executable instructions for causing a computing device to transition from a low power state using a pen device that, upon execution by a processor of the pen device, cause the processor of the pen device to at least:
obtain gesture input data from at least one sensor of the pen device;
compare the obtained gesture input data to at least one gesture pattern;
based on the gesture input data matching the at least one gesture pattern, generate a wakeup event message; and
transmit the wakeup event message to the computing device via a network interface of the pen device, wherein the wakeup event message is transmitted using a communication protocol that the computing device is configured to receive in the low power state.
wherein the computer-executable instructions include instructions that, upon execution by a processor of the computing device, cause the processor of the computing device to at least:
receive the wakeup event message from the pen device via the network interface;
generate a confidence value of the wakeup event message;
compare the confidence value to a defined confidence threshold; and
based on the confidence value exceeding the confidence threshold, transition the computing device from the low power state to an active state.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for obtaining gesture input data from at least one sensor of a pen device, means for comparing the obtained gesture input data to at least one gesture pattern, means for generating a wakeup event message based on the gesture input data matching the at least one gesture pattern, and means for transmitting the wakeup event message to a computing device over a network interface of the pen device, wherein the wakeup event message is transmitted using a communication protocol that the computing device is configure to receive in a low power state. The illustrated one or more processors 619 together with the computer program code stored in memory 622 constitute exemplary processing means for obtaining and processing sensor data, comparing data to gesture patterns, calculating confidence values and comparing the values to a confidence threshold, and transitioning the computing device to an active state as described herein.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for causing a computing device to transition from a low power state using a pen device, the system comprising:
   at least one processor of the pen device;
   at least one network interface of the pen device;
   at least one sensor of the pen device; and
   at least one memory of the pen device comprising computer program code, the at least one memory and the computer program code configured to, with the at least one processor, cause the at least one processor to:
   obtain, via the at least one sensor, gesture input data;
   compare the obtained gesture input data to at least one gesture pattern;
   based on the gesture input data matching the at least one gesture pattern, generate a wakeup event message;
   transmit, via the network interface, the wakeup event message to the computing device to transition the computing device out of the low power state, wherein the wakeup event message is transmitted using a communication protocol that the computing device is configured to receive in the low power state; and
   deactivate the obtaining of the gesture input data for the purpose of detecting wakeup events.

2. The system of claim 1 further comprising:
   at least one processor of the computing device;
   at least one network interface of the computing device; and
   at least one memory of the computing device comprising computer program code, the at least one memory of the computing device and the computer program code configured to, with the at least one processor of the computing device, cause the at least one processor of the computer device to:
   receive the wakeup event message from the pen device via the network interface;
   generate a confidence value of the received wakeup event message;
   compare the generated confidence value to a defined confidence threshold; and
   based on the confidence value exceeding the confidence threshold, transition the computing device from the low power state to an active state.

3. The system of claim 2, the at least one memory of the computing device and the computer program code configured to, with the at least one processor of the computing device, further cause the at least one processor of the computer device to:
   based on the confidence value failing to exceed the confidence threshold, ignore the wakeup event message, whereby the wakeup event message is treated as an unintentional wakeup event.

4. The system of claim 1, wherein the computing device is configured to:
   based on the transition from the low power state to the active state, disable a capability to receive wakeup event messages from the pen device for a defined time interval.

5. The system of claim 1, wherein the computing device is configured to:
   prompt a user of the computing device for wakeup event feedback via a user interface of the computing device; and
   based on receiving wakeup event feedback, adjust a wakeup gesture pattern associated with the wakeup event message; and
   upload the adjusted wakeup gesture pattern to the pen device.

6. The system of claim 1, wherein the at least one gesture pattern includes tapping the pen device against a surface at least one time, wherein the tapping is detected by at least one of an inertial measurement unit (IMU) and a pressure sensor of the at least one sensor of the pen device.

7. The system of claim 1, wherein the at least one gesture pattern includes moving the pen device in a pattern of one or more movements, wherein the one or more movements are detected by an IMU of the pen device.

8. The system of claim 1, wherein obtaining the gesture input data includes:
   detecting a first sensor of the pen device being pressed, wherein the first sensor includes at least one of a button, a switch, or a pressure sensor; and
   based on the detected pressing of the first sensor of the pen device, obtaining gesture input data from at least one sensor of the pen device other than the pressed first sensor.

9. The system of claim 1, wherein the at least one sensor of the pen device includes at least one of an IMU, a button, a switch, a pressure sensor, a capacitive sensor, or a microphone.

10. A computerized method for causing a computing device to transition from a low power state using a pen device, the method comprising:
    obtaining, by the pen device, gesture input data from at least one sensor of the pen device;
    comparing, by the pen device, the obtained gesture input data to at least one gesture pattern;
    based on the gesture input data matching the at least one gesture pattern, generating, by the pen device, a wakeup event message;
    transmitting, by the pen device, the wakeup event message to the computing device over a network interface of the pen device to transition the computing device out of the low power state, wherein the wakeup event message is transmitted using a communication protocol that the computing device is configured to receive in the low power state; and
    deactivating the obtaining of the gesture input data for the purpose of detecting wakeup events.

11. The computerized method of claim 10, further comprising:
    receiving, by the computing device, the wakeup event message from the pen device via a network interface of the computing device;
    generating, by the computing device, a confidence value of the wakeup event message;
    comparing, by the computing device, the confidence value to a defined confidence threshold; and
    based on the confidence value exceeding the confidence threshold, transitioning, by the computing device, from the low power state to an active state.

12. The computerized method of claim 11, wherein generating the confidence value of the wakeup event message includes calculating the confidence value based on a combination of a first sensor data set included in the wakeup event message and a second sensor data set from at least one sensor of the computing device.

13. The computerized method of claim 11, further comprising:
based on the confidence value failing to exceed the confidence threshold, ignoring, by the computing device, the wakeup event message, whereby the wakeup event message is treated as an unintentional wakeup event.

14. The computerized method of claim 11, further comprising:
prompting, by the computing device, a user of the computing device for wakeup event feedback via a user interface of the computing device; and
based on receiving wakeup event feedback, adjusting, by the computing device, the confidence threshold.

15. The computerized method of claim 10, further comprising:
based on the transition from the low power state to the active state, disabling, by the computing device, a capability to receive wakeup event messages from the pen device for a defined time interval.

16. The computerized method of claim 10, further comprising:
receiving, by the computing device, a request to define a new wakeup gesture pattern;
obtaining, based on the request, new gesture input data from the at least one sensor of the pen device;
defining, by the computing device, a new wakeup gesture pattern based on the obtained new gesture input data; and
uploading, by the computing device, the new wakeup gesture pattern to the pen device.

17. The computerized method of claim 10, wherein the at least one gesture pattern includes tapping the pen device against a surface at least one time, wherein the tapping is detected by at least one of an IMU and a pressure sensor of the at least one sensor of the pen device.

18. The computerized method of claim 10, wherein obtaining the gesture input data includes:
detecting a first sensor of the pen device being pressed, wherein the first sensor includes at least one of a button, a switch, or a pressure sensor; and
based on the detected pressing of the first sensor of the pen device, obtaining gesture input data from at least one sensor of the pen device other than the pressed first sensor.

19. One or more computer storage media having computer-executable instructions for causing a computing device to transition from a low power state using a pen device that, upon execution by a processor of the pen device, cause the processor of the pen device to at least:
obtain gesture input data from at least one sensor of the pen device;
generate a wakeup event message based on the obtained gesture input data, the wakeup event message including at least a portion of the obtained gesture input data;
transmit the wakeup event message to the computing device via a network interface of the pen device to transition the computing device out of the low power state, wherein the wakeup event message is transmitted using a communication protocol that the computing device is configured to receive in the low power state; and
deactivate the obtaining of the gesture input data for the purpose of detecting wakeup events.

20. The one or more computer storage media of claim 19, wherein the computer-executable instructions include instructions that, upon execution by a processor of the computing device, cause the processor of the computing device to at least:
receive the wakeup event message from the pen device via the network interface;
generate a confidence value of the wakeup event message;
compare the confidence value to a defined confidence threshold; and
based on the confidence value exceeding the confidence threshold, transition the computing device from the low power state to an active state.

\* \* \* \* \*